April 1, 1969 W. STEUERNAGEL 3,435,594
ELECTRODE DISCHARGE PLATE FOR DUST COLLECTOR
Filed Oct. 19, 1967

Inventor:
WALTER STEUERNAGEL
BY
Stephens, Huettig & O'Connell
ATTORNEYS

Fig. 6a
Fig. 6b
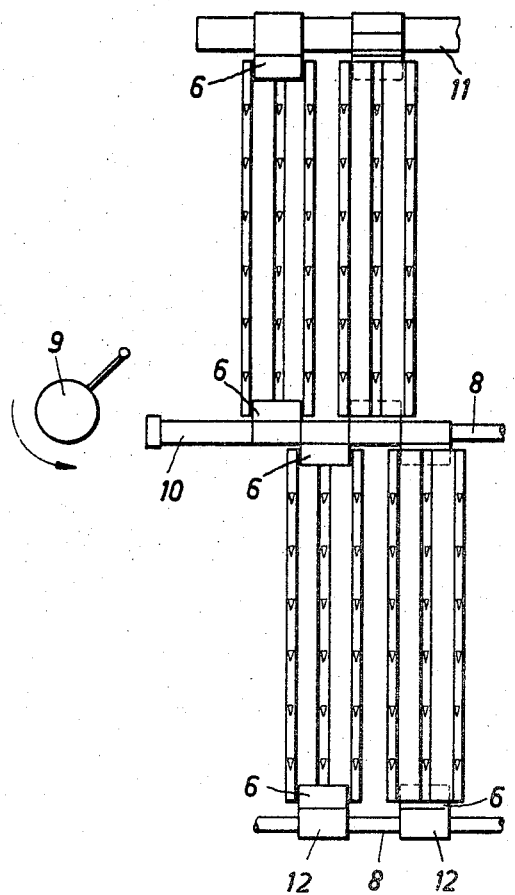
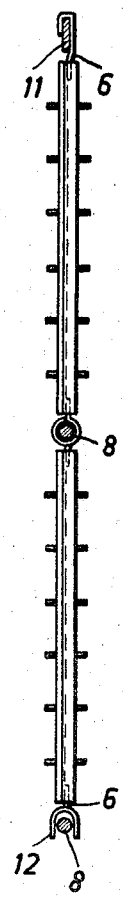
Inventor:
WALTER STEUERNAGEL
BY
Stephens, Huettig & O'Connell
ATTORNEYS United States Patent Office 3,435,594
Patented Apr. 1, 1969

3,435,594
ELECTRODE DISCHARGE PLATE FOR DUST COLLECTOR
Walter Steuernagel, Frankfurt am Main, Germany, assignor to Metallgesellschaft Aktiengesellschaft, Frankfurt am Main, Germany
Filed Oct. 19, 1967, Ser. No. 676,402
Claims priority, application Germany, Oct. 28, 1966, M 71,485
Int. Cl. B03c 3/76, 3/40
U.S. Cl. 55—112    1 Claim

ABSTRACT OF THE DISCLOSURE

The discharge plate for an electrostatic dust collector or separator is a flat metal plate having trapezoidal ridges pressed out alternately on both sides of the plate. Each ridge has an outer portion parallel to the plane of the metal plate and discharge points are punched out of the outer portion and extend normal to the plane of the outer portion. This electrode has good electrical characteristics as well as high mechanical rigidity and good dust shaking vibrating properties.

---

For the dedusting of gases in electrostatic dust collectors with extended surface collecting electrodes, rods or wires are arranged as discharge electrodes opposite to the dust collecting electrodes. Operational experience showed that these discharge electrodes are soon covered with a layer of dust which is detrimental to the corona effect. To overcome this drawback, the discharge electrodes are rapped as are the collecting electrodes in order to make the dust fall off into the hoppers. Due to their shape, the discharge electrodes can stand mechanically only a lesser rapping stress than the collecting electrodes. Thus frequent breakage of discharge wires occurs with consequent arc-overs in the electrostatic dust collector and decrease of the collecting efficiency. To give the discharge electrodes with regard to their cleaning the same rigidity as the collecting electrodes, it has been proposed to construct also the discharge electrodes in the form of plates. Reference is made to the Swiss Patent No. 381,203, the British Patent No. 966,558 and to the French Patent No. 1,328,278. The latter is remarkable by the fact that the discharge elements consist of metal bands the lateral edges of which are rolled in or bent out, these parts having a certain number of spherical protuberances which act as discharge points. The solution disclosed in Austrian Patent No. 225,810 has each essentially flat plate forming a discharge electrode bent at its two lateral edges in such a way that each lateral edge represents a stiffening border which is essentially normal to the plane of the plate, and along these stiffening borders discharge spikes are punched out of the plate material and bent to be about the normal to the plane of the plate. Also, German Registered Design No. 1,888,228 describes an electrostatic dust collector in which relatively wide bands with rolled-in lateral edges are used as discharge electrodes. These bands have teeth, spikes, points or the like punched and bent out of both sides and spaced in the gas flow direction preferably equal to the distance of each other to the usual discharge wires.

The solution proposed in Swiss Patent No. 381,203 is not satisfactory. As illustrated in FIG. 2 of said patent, such a discharge electrode plate is constructed of four individual items: these are the two end pieces 1 which act as discharge points on both sides, the base piece 2 and the bracing piece 13. The manufacturing of such an electrode is already too complex. In addition to this, the weight of such an electrode is very high so that special provisions have to be employed for its suspension. Tests proved moreover that the effectiveness of these electrodes did not justify such expenditure.

Essentially the same applies to the discharge electrode according to the British Patent No. 966,558. In this construction, the fact that the discharge electrodes and the collecting electrodes are of the same shape is especially disturbing to the gas flow as the edges of the transverse members at the ends of the electrodes obstruct a homogeneous and laminar gas flow.

Discharge points as proposed in French Patent No. 1,328,278 are not sufficiently effective because they are only insignificant on the spherical protuberances. In addition to this, the manufacturing of such discharge electrodes is also very costly. Though the construction according to the Austrian Patent No. 225,810 surpasses the constructions of the Swiss Patent No. 381,203 and British Patent No. 966,558 because they include discharge points which are punched out of the plate-shaped electrode, to this construction is applied essentially the same which was said with respect to the constructions of the Swiss and British patents. The production costs are not in reasonable proportion to the results obtained with these types of electrodes.

It seems that the plate-shaped discharge electrode disclosed in German Registered Design No. 1,888,228 is the most effective of all the above-described electrodes according to the present state of technology. But this construction also has a certain drawback as the discharge points are set directly on the plane surface of the plate, the lateral edges of the plate being rolled in annularly. The electric field lines emitting from the discharge points are considerably disturbed by the plane surface as well as by the annular roll so that the points are never fully effective.

In order to remedy the disadvantages of the electrodes of the present state of technology, this invention proposes a plate-shaped discharge electrode for electrostatic dust collectors which has discharge points punched and bent out of the electrode, at places where trapezoidal ridges are pressed out of the electrode plate alternately on both sides, the discharge points being arranged on that part of each trapezoidal ridge which is parallel to the plane of the plate.

Compared to the electrodes of the present state of technology, the electrode according to this invention has the advantage that the discharge points are arranged in localities which are additionally protruding out of the plane of the plate. The alternate lifting of the discharge points by pressing out of the plate ridges of trapezoidal cross-section is not only advantageous for the electrical field lines issuing from the discharge points but insures also a high mechanical rigidity of the electrode plate itself. The vibratory properties of such a discharge electrode are excellent, thus necessitating only comparatively low hammer weights for the cleaning of the electrodes by rapping.

The means by which the objects of the invention are obtained are described more fully with reference to the accompanying drawings, in which:

FIGURE 5 is a front view showing the assembly of a plurality of the electrode shown in FIGURE 4a;

FIGURE 6a is a view showing a plurality of the electrodes assembled in a horizontal flow collector; and FIGURE 6b is a side view of FIGURE 6a.

Figure 1:
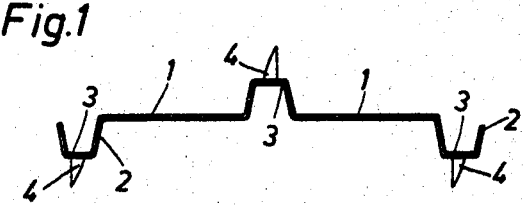
FIGURE 1 is an end view of the electrode of this invention.
Figure 2:
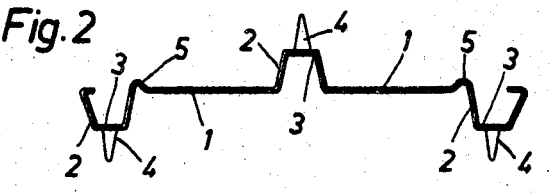
FIGURE 2 is a similar view of a modified form of FIGURE 1.
Figure 3:
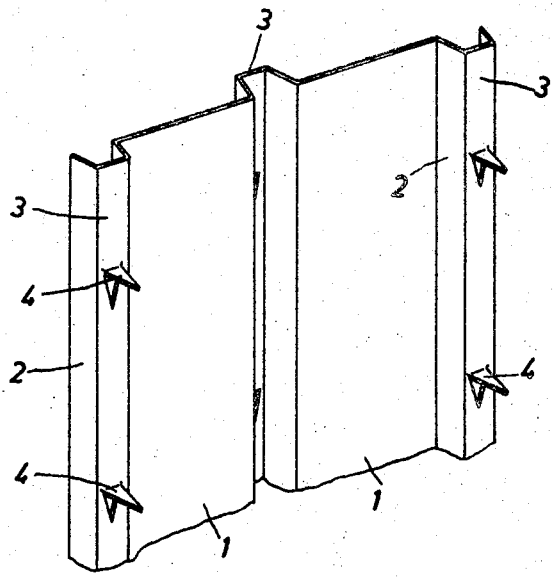
FIGURE 3 is a perspective view of the electrode of FIGURE 1.

The discharge electrode as shown in FIGURES 1, 2 and 3 consists of a plane metal plate 1, to which, alternately on both sides, ridges 2 with trapezoidal cross-section are pressed out. Each trapezoidal ridge has a portion 3 which is parallel to the plane of the plate 1. Out of these portions 3 discharge points 4 are punched and bent up normal to the surface. It is also possible and within the scope of this invention that individual discharge points of any shape are set on these plane portions 3. Such a discharge electrode consisting essentially of a plate-like small strip has a width of about 200 to 400 mm. The individual alternate trapezoidal ridges have a distance from each other of about 80 to 160 mm., corresponding to the actual width of the duct. Thereby it follows that the individual electrode strips are equidistantly supported side by side or one above the other. These distances are such that the discharge points on the ridges of the plate-shaped discharge electrodes do not interfere with each other and do not disturb the formation of the electrical field.

In the modification of FIGURE 2, ribs 5 are formed in the plate 1 adjacent the outermost ridges 2 for the purpose of increasing the stiffness of the electrode. These ribs are so small as to not interfere with the desired properties of the electrode.

Figure 4A:
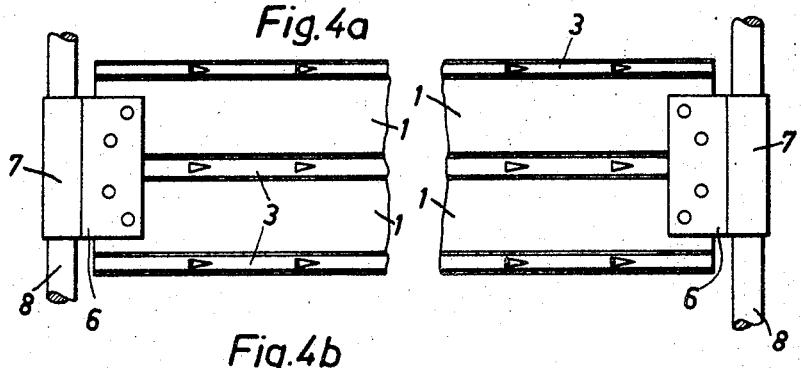
FIGURE 4a is a front view of the electrode as mounted in a vertical flow electrostatic dust collector.
Figure 4B:
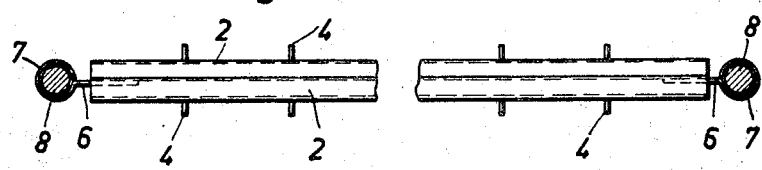
FIGURE 4b is a side view of FIGURE 4.
Figure 5:
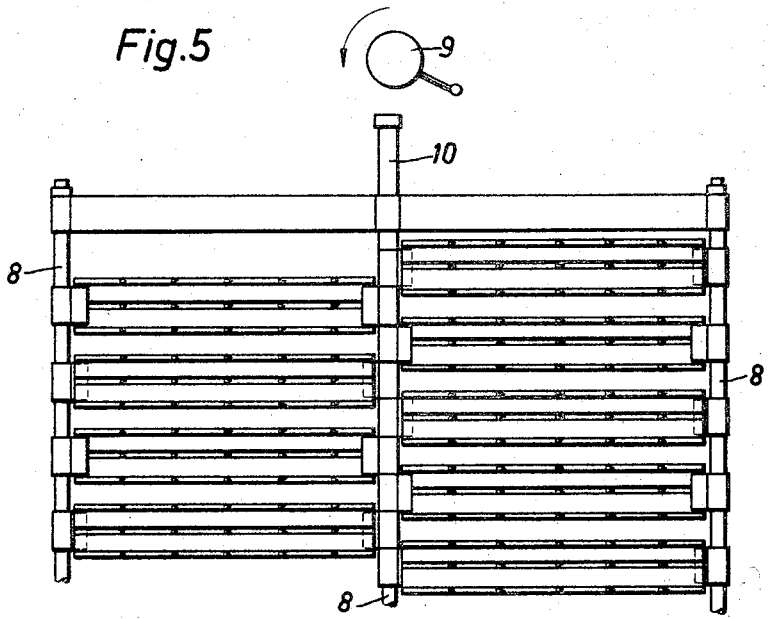

The electrode strips are strung on rods or supported by rods, respectively, as shown in FIGURES 4a to 6b. When the electrodes of the invention are employed in vertical flow electrostatic dust collectors, the discharge electrodes are arranged as illustrated in FIGS. 4a to 5. To the two ends of an electrode strip metal plates 6 with annularly rolled-in ends 7 are fastened by screw bolts or by rivets, and the annularly rolled-in ends pushed as sleeves over the round rods 8. The length of the plate-shaped discharge electrode strips is such that at least two of them together are equal to one field width or to one field length respectively. In that way, it is possible to apply a central rapping means consisting for instance of a tumbling hammer 9 for striking a rapping rod 10 formed on the upper end of rod 8.

As shown in FIGURES 6a and 6b, the conditions for a horizontal flow electrostatic dust collector are similar. The vertical rod 8 of FIGURE 5 now becomes a horizontal beam 11, and the supporting metal plates 6 are bent into the form of hooks. The middle rod 8 again is a rod as shown in FIGURE 5 and shaped at its end as a rapping rod 10, onto which a tumbling hammer gives its momentum for the cleaning of the electrodes. The lower end of the electrode strips need only be guided by a rod 8 by means of an inverted U-shaped member 12 which is fastened to the metal plate 6.

Having now described the means by which the objects of the invention are obtained, I claim:

1. A plate discharge electrode for an electrostatic dust collector comprising two planar coplanar plate metal sections (1) joined by a first trapezoidal ridge (3), additional trapezoidal ridges (3) on the edge of each section (1) opposite said first trapezoidal ridge and extending from the plane of said plate metal sections (1) in a direction opposite to said first ridge (3), triangular discharge points (4) punched out of each ridge and extending perpendicular to the plane of said plate metal sections, said electrode having a width of from 200 to 400 mm. and said ridges being spaced from 80 to 160 mm. apart, a plate element (6) rigidly secured to each end of the electrode, respectively, first rod means (8, 11) attached to one plate element for holding one end of the electrode, and rapping rod means (8, 10) secured to the other plate element for being struck by a tumbling hammer.

References Cited

UNITED STATES PATENTS

| 2,195,431 | 4/1940 | Shively et al. | 55—152 X |
| 3,158,454 | 11/1964 | Gustafsson | 55—152 |
| 3,200,566 | 8/1965 | Gustafsson et al. | 55—152 |
| 3,282,029 | 11/1966 | Steuernagel | 55—154 X |

FOREIGN PATENTS

| 70,074 | 10/1949 | Denmark. |
| 855,621 | 12/1960 | Great Britain. |
| 926,128 | 5/1963 | Great Britain. |
| 963,109 | 7/1964 | Great Britain. |
| 966,558 | 8/1964 | Great Britain. |

HARRY B. THORNTON, *Primary Examiner.*

DENNIS E. TALBERT, JR., *Assistant Examiner.*

U.S. Cl. X.R.

55—130, 140, 152; 173—94